No. 612,571. Patented Oct. 18, 1898.
E. PRIDMORE.
HORSE HAY RAKE.
(Application filed Oct. 16, 1897.)
(No Model.) 2 Sheets—Sheet 1.

Witnesses:
Henry L. Deck.
Chas. F. Burkhardt.

Edward Pridmore — Inventor.
By Wilhelm & Bonner,
Attorneys.

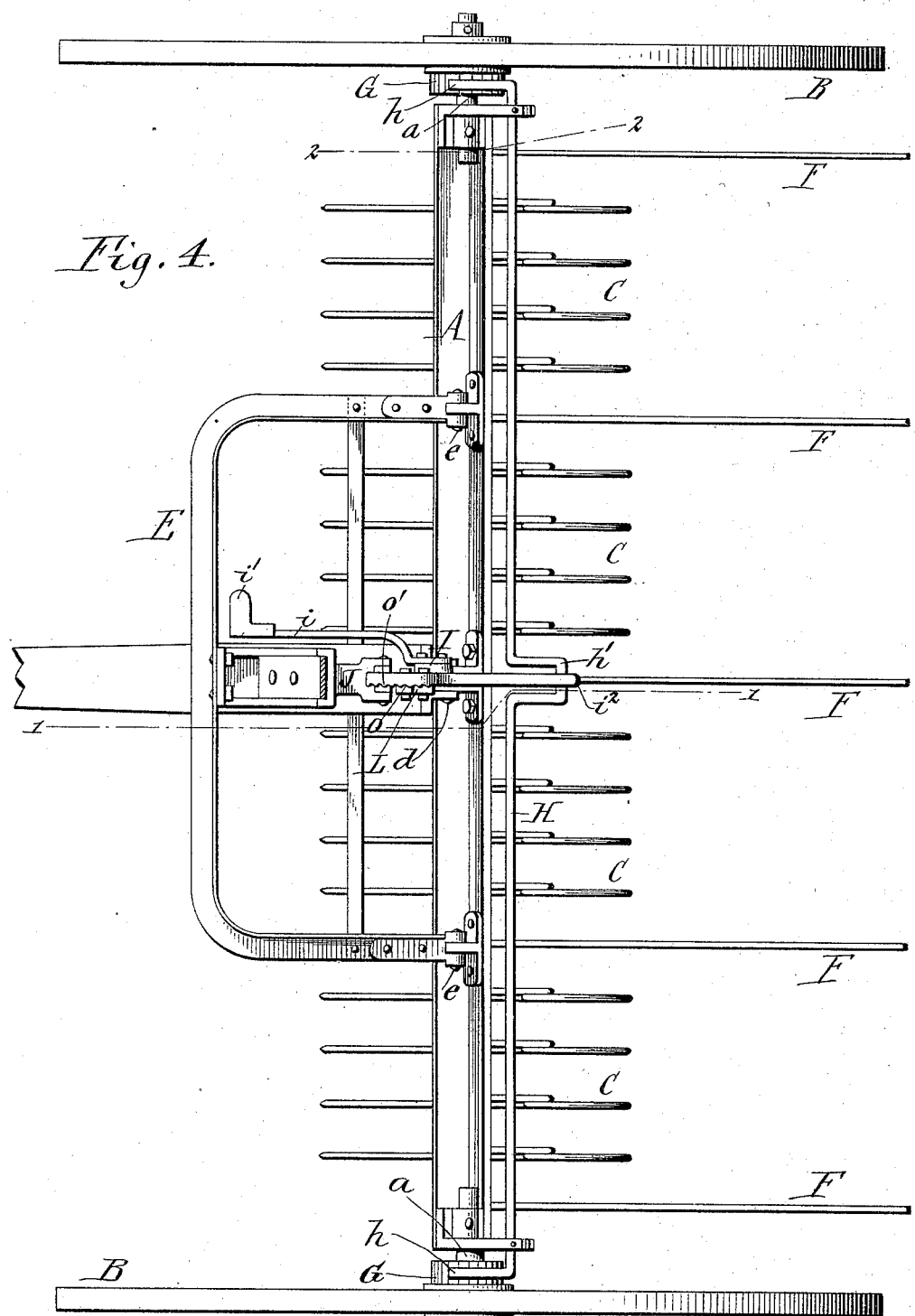

UNITED STATES PATENT OFFICE.

EDWARD PRIDMORE, OF BATAVIA, NEW YORK, ASSIGNOR TO THE JOHNSTON HARVESTER COMPANY, OF SAME PLACE.

HORSE HAY-RAKE.

SPECIFICATION forming part of Letters Patent No. 612,571, dated October 18, 1898.

Application filed October 16, 1897. Serial No. 655,398. (No model.)

*To all whom it may concern:*

Be it known that I, EDWARD PRIDMORE, a citizen of the United States, residing at Batavia, in the county of Genesee and State of New York, have invented a new and useful Improvement in Horse Hay-Rakes, of which the following is a specification.

This invention relates to that class of horse hay-rakes in which the rake-head carrying the teeth is elevated by the rotation of the supporting-wheels of the rake and in which the rake-head is automatically disengaged from the wheels and permitted to drop after the load has been dumped. In this class of rakes it often happens that when the rake is drawn with the thills or the pole in a forwardly-inclined position—for instance, when drawn by a small team—the rake-head swings so far forwardly over the center of the wheels before it is released that it does not readily drop when released, in which case the rake passes over a considerable portion of ground between the raising of the teeth and the dropping of the same, which portion of the ground remains unraked.

The object of this invention is to provide the rake with an adjusting device which enables the point at which the rake-teeth are dropped to be regulated as may be rendered necessary by the position of the pole or thills, whether drawn by high or low horses or whether hitched high or low on the horses.

Figure 1:
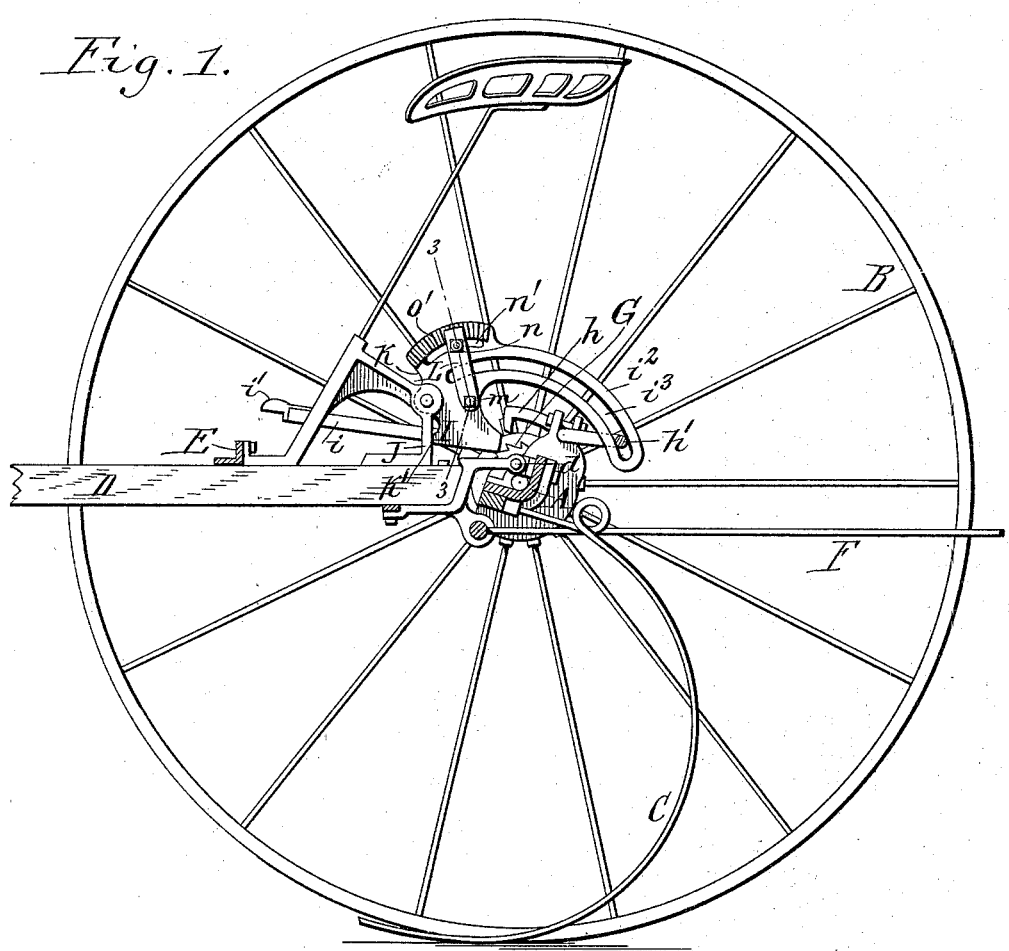
Figure 2:
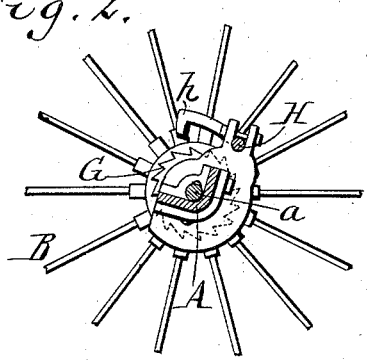
Figure 3:
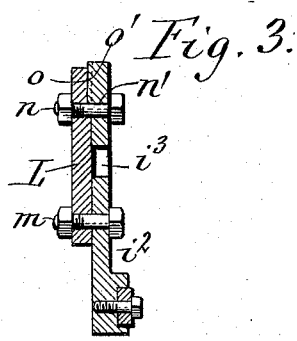

In the accompanying drawings, consisting of two sheets, Figure 1 is a vertical longitudinal section of a hay-rake embodying my improvements, taken in line 1 1, Fig. 4. Fig. 2 is a similar fragmentary view in line 2 2, Fig. 4. Fig. 3 is a vertical transverse section, on an enlarged scale, in line 3 3, Fig. 1. Fig. 4 is a top plan view of my improved hay-rake.

Like letters of reference refer to like parts in the several figures.

A represents the rake head or axle, provided at its ends with trunnions or axle-arms $a$ $a$, B B the supporting and driving wheels, journaled on the axle-arms, and C the rake-teeth, secured to the rake-head and extending rearwardly, downwardly, and forwardly therefrom.

D represents the draft-pole, which is pivoted transversely at its rear end by a pivot $d$ to the central upper portion of the rake-head, and E is the draft-frame connected with the pole and pivotally connected with the rake-head on opposite sides of the pole by pivots $e$ $e$, arranged axially in line with the pivot of the pole.

F are the clearer-rods, secured with their front ends to the draft-frame and projecting rearwardly between the rake-teeth.

G G represent the clutch-wheels arranged on the inner ends of the hubs of the driving-wheels, and H is the transverse clutch-shaft, which is journaled in upwardly-projecting bearings on the ends of the rake-head and which is provided at its ends with forwardly-projecting coupling hooks or pawls $h$, adapted to be engaged with and disengaged from the clutch-wheels. The central portion of the clutch-shaft is provided with a rearwardly-bent portion forming a crank $h'$. During the operation of raking the crank is arranged horizontally or nearly so, as shown in Fig. 1, in which position the coupling-pawls are out of engagement with the teeth of the clutch-wheels and the rake-teeth remain in their lowest or operative position. Upon raising the crank the shaft is turned in the direction for engaging the pawls with the clutch-wheels, which causes the rake-head to be coupled with the driving-wheels and the rake-teeth to be lifted from the ground for dumping the load of hay. After the load has been discharged by the teeth the crank and shaft are turned backward, thereby disengaging the coupling-pawls from the clutch-wheels and permitting the rake-head to turn backward and the rake-teeth to drop to the ground.

I represents the dumping or trip lever, whereby the clutch-shaft is operated for coupling the rake-head with the driving-wheels. This lever is pivoted centrally to a standard J, arranged on the upper rear portion of the pole, and is provided on its front arm $i$ with a treadle $i'$. The rear arm $i^2$ of the trip-lever is arranged over the clutch-shaft and is provided with an upwardly-curved slot $i^3$, which receives the wrist of the crank $h'$ on the clutch-shaft. The turning movement of the trip-lever is limited by upper and lower stops or shoulders $k$ $k'$, arranged on the lever and adapted to engage with the standard above and below the pivot of the lever. Upon depressing the front arm of the trip-lever its rear arm raises the crank and turns the shaft, so as to couple the rake-head with the driving-wheels and cause the rake-teeth to be lifted. All of these parts are old and well known. In these rakes as heretofore constructed the crank of the shaft moves forwardly in the slot of the trip-lever until the wrist of the crank strikes the front end of the slot. This stops its forward movement, while the rake-head continues its forward movement, which causes the clutch-shaft to be turned in the direction for disengaging the coupling-pawls from the clutch-wheels. When this has been accomplished, the rake-teeth drop or swing backward and downward, together with the rake-head and clutch-shaft.

It is desirable that the rake-teeth should drop back into an operative position upon the ground as quickly as possible after the teeth have discharged their load, so as to avoid leaving an unraked portion of ground after each load.

When the rake is drawn with the pole raised considerably, as when hitched high on the horses or hitched to tall horses, the front end of the slot of the trip-lever operates well enough as a stop to arrest the crank and uncouple the rake from the driving-shaft, because in that position of the parts the rake-teeth in their highest position overhang the axis of the rake-head sufficiently to cause the rake-teeth when released to descend quickly and before the rake has traveled forwardly any considerable distance. When the rake is drawn by small horses or the pole is hitched low to the horses, the front end of the slot in the trip-lever does not operate satisfactorily as a stop for throwing the clutch out of gear, because this end of the slot is then located so far in front of the axis of the rake-head that the rake-teeth when raised into their highest position are very near the dead-center. The rake-teeth when released while in this position do not begin their downward movement promptly, but lag, so that the teeth pass over a considerable portion of unraked ground before they again reach their operative position. In order to avoid this difficulty and to control the dumping operation regardless of whether the pole is hitched high or low to the horses, an adjustable stop is arranged adjacent to the front end of the slot of the trip-lever for engagement with the crank of the clutch-shaft. This adjustable stop is preferably constructed as follows:

L represents a vertical stop-bar, which is arranged on one side of the rear arm of the trip-lever, adjacent to the front portion of the slot therein, and which is pivoted at its lower end by a horizontal bolt $m$ to the trip-lever, so that its upper portion can be shifted back and forth along the slot. When the pole is hitched low, the bar is shifted backwardly over the slot, so as to be struck by the crank $h'$ earlier and uncouple the rake-teeth earlier from the driving mechanism and before the rake-teeth have been raised too near the dead-center. When the pole is hitched high, the stop-bar is shifted forwardly over the slot, so as to uncouple the rake-teeth later from the driving mechanism and permit the teeth to be raised the proper distance from the ground. The stop-bar is held in its adjusted position by a clamping-bolt $n$, which passes through a segmental slot $n'$ in the trip-lever. In order to prevent the stop-bar from being shifted by the repeated blows of the crank against the same, the stop-arm is provided with radial teeth or serrations $o$, which interlock with similar teeth or serrations $o'$ on the trip-lever when the parts are in their working position. Upon loosening the bolts the stop-bar can be shifted as may be necessary.

I claim as my invention—

1. The combination with the rake-head, the dumping-lever having a slot, the clutch, and the clutch-shaft having a crank moving in said slot, of a stop arranged across said slot near one end thereof, and means whereby the stop can be adjusted lengthwise of the slot to regulate the length of the slot and thereby the point at which the forward movement of said crank is arrested, substantially as set forth.

2. The combination with the rake-head, the dumping-lever having a slot, the clutch, and the clutch-shaft having a crank moving in said slot, of a stop-bar arranged across said slot and connected to the dumping-lever by a pivot-bolt and by an adjusting-bolt passing through the outer end of said bar and through an adjusting-slot in the dumping-lever, substantially as set forth.

Witness my hand this 8th day of October, 1897.

EDWARD PRIDMORE.

Witnesses:
 GEORGE O. VOLZ,
 F. E. HOWE.